(12) United States Patent
Ikeda

(10) Patent No.: US 8,126,998 B2
(45) Date of Patent: Feb. 28, 2012

(54) INFORMATION PROCESSING APPARATUS AND METHOD OF CONTROLLING THEREOF

(75) Inventor: Nobuhiro Ikeda, Yokohama (JP)

(73) Assignee: Canon Kabushiki Kaisha (JP)

( * ) Notice: Subject to any disclaimer, the term of this patent is extended or adjusted under 35 U.S.C. 154(b) by 325 days.

(21) Appl. No.: 12/533,637

(22) Filed: Jul. 31, 2009

(65) Prior Publication Data

US 2010/0049844 A1    Feb. 25, 2010

(30) Foreign Application Priority Data

Aug. 21, 2008    (JP) ................................ 2008-213223

(51) Int. Cl.
*G06F 15/173* (2006.01)
(52) U.S. Cl. .......................... 709/223; 709/224; 709/239
(58) Field of Classification Search .......... 709/201–203, 709/206, 218, 223, 238; 340/254–255
See application file for complete search history.

(56) References Cited

U.S. PATENT DOCUMENTS

| 2007/0109981 A1 | 5/2007 | Hirano et al. | |
| 2008/0070563 A1* | 3/2008 | Adya et al. ................. | 455/422.1 |
| 2008/0293404 A1* | 11/2008 | Scherzer et al. ........... | 455/426.1 |

FOREIGN PATENT DOCUMENTS

| JP | 2003-324449 | 11/2003 |
| JP | 2005-094157 | 4/2005 |
| JP | 2005-311576 A | 11/2005 |

* cited by examiner

*Primary Examiner* — Joon H Hwang
*Assistant Examiner* — Thomas Lee, IV
(74) *Attorney, Agent, or Firm* — Rossi, Kimms & McDowell LLP

(57) ABSTRACT

In order to identify a wireless device that is not under management in a wireless communication network, a management apparatus includes an acquisition unit configured to acquire information from the wireless terminal; a storage unit configured to correlate and store the wireless base station detected by the wireless terminal and a wireless terminal wirelessly connected to this wireless base station; a deriving unit configured to derive a wireless base station which does not have a wireless connection with a wireless terminal; a requesting unit configured to request a wireless terminal for transmission of data that has passed through this wireless base station; and a determination unit which, if requested data that has passed through the wireless base station from the wireless terminal has not been received, is configured to determine that this wireless base station is a wireless base station that is not under management.

9 Claims, 11 Drawing Sheets

F I G. 1
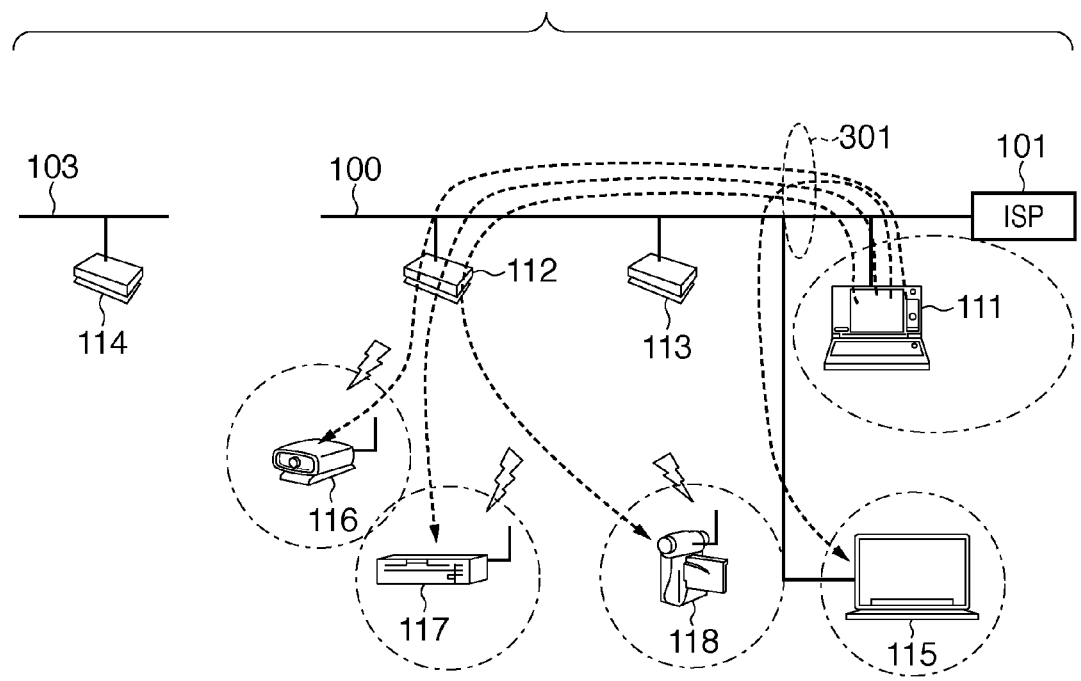

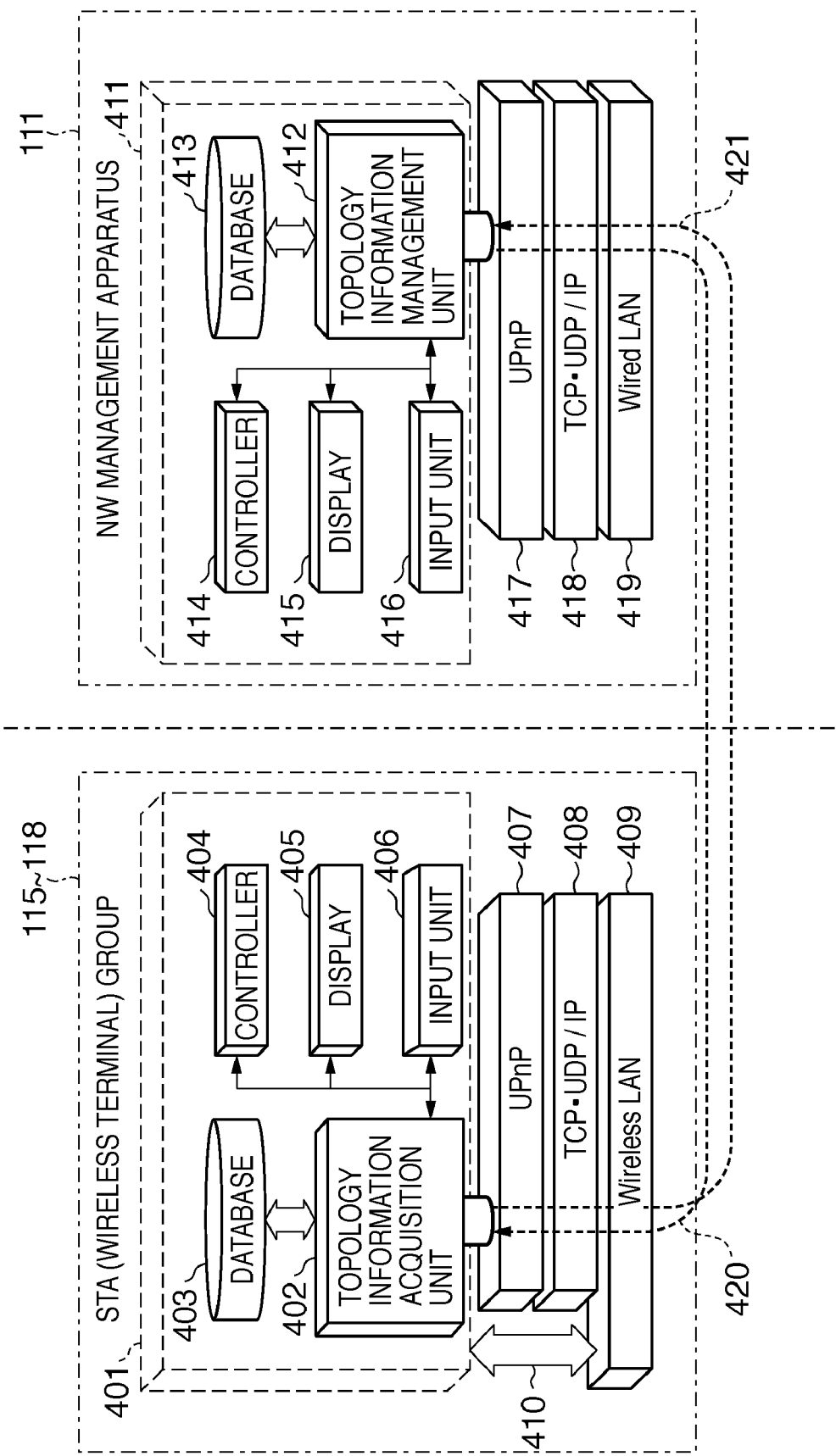

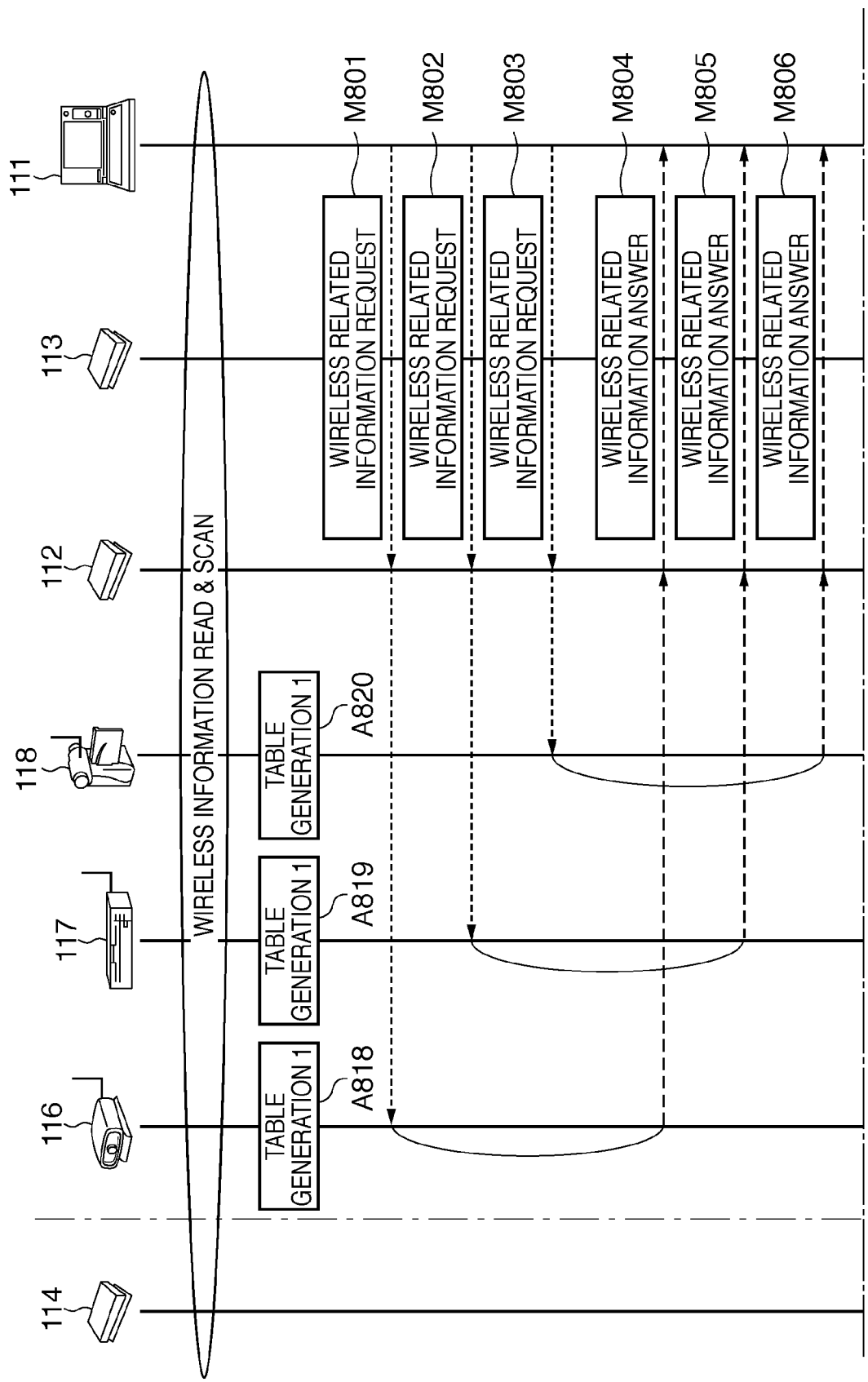

T201

| Area No. | SSID | BSSID | RSSI (dB) | Assoc | PHYRate (Mbps) | DataRate (Mbps) |
|---|---|---|---|---|---|---|
| 1 | AP1 | xx:xx:xx:xx:xx:xx | 43 | 1 | 54 | 12 |
| 2 | AP2 | yy:yy:yy:yy:yy:yy | 20 | 0 | 36 | 0 |
| 3 | AP3 | zz:zz:zz:zz:zz:zz | 38 | 0 | 54 | 0 |

T202

| Area No. | SSID | BSSID | RSSI (dB) | Assoc | PHYRate (Mbps) | DataRate (Mbps) |
|---|---|---|---|---|---|---|
| 1 | AP1 | xx:xx:xx:xx:xx:xx | 50 | 1 | 54 | 12 |
| 2 | AP3 | zz:zz:zz:zz:zz:zz | 32 | 0 | 54 | 0 |

T203

| Area No. | SSID | BSSID | RSSI (dB) | Assoc | PHYRate (Mbps) | DataRate (Mbps) |
|---|---|---|---|---|---|---|
| 1 | AP1 | xx:xx:xx:xx:xx:xx | 40 | 1 | 54 | 6 |
| 2 | AP2 | yy:yy:yy:yy:yy:yy | 36 | 0 | 36 | 0 |

| SSID Name | BSSID | STA | RSSI (dB) | STA MAC | PHYRate (Mbps) | DataRate (Mbps) |
|---|---|---|---|---|---|---|
| AP1 | xx:xx:xx:xx:xx:xx | 16 | 43 | 01:xx:xx:xx:xx:xx | 54 | 6 |
|  |  | 17 | 50 | 02:yy:yy:yy:yy:yy | 54 | 12 |
|  |  | 18 | 40 | 03:zz:zz:zz:zz:zz | 54 | 6 |
| AP2 | yy:yy:yy:yy:yy:yy | 16 | 20 | - | 36 | - |
|  |  | 18 | 36 | - | 36 | - |
| AP3 | zz:zz:zz:zz:zz:zz | 16 | 38 | - | 54 | - |
|  |  | 17 | 32 | - | 54 | - |

T504

| SSID Name | BSSID | STA | RSSI (dB) | STA MAC | PHYRate (Mbps) | DataRate (Mbps) |
|---|---|---|---|---|---|---|
| AP1 | xx:xx:xx:xx:xx:xx | 16 | 43 | 01:xx:xx:xx:xx:xx | 54 | 6 |
| | | 17 | 50 | 02:yy:yy:yy:yy:yy | 54 | 12 |
| | | 18 | 40 | 03:zz:zz:zz:zz:zz | 54 | - |
| AP2 | yy:yy:yy:yy:yy:yy | 16 | 20 | 01:xx:xx:xx:xx:xx | 36 | - |
| | | 18 | 36 | 03:zz:zz:zz:zz:zz | 36 | 20 |
| AP3 | zz:zz:zz:zz:zz:zz | 16 | - | - | - | - |
| | | 17 | - | - | - | - |

INFORMATION PROCESSING APPARATUS AND METHOD OF CONTROLLING THEREOF

BACKGROUND OF THE INVENTION

1. Field of the Invention

The present invention relates to a technique for identifying a wireless device not targeted for management in a wireless communication network.

2. Description of the Related Art

Universal Plug and Play (UPnP) is available as a discovery technique for detecting device capability in a network. Further, a standard protocol such as LLDP (Logical Link Discovery Protocol) has been defined by IEEE 802.1ab in recent years in order to detect the devices constituting a network. Furthermore, LLTD (Link Layer Topology Discovery) has been proposed by Microsoft in the USA. Further, with UPnP, the standardization of image transmission technologies that take QoS (Quality of Service) into account is proceeding in order to enhance the audio/visual (AV) function, namely the reproduction of audio and video in the system. Various network management techniques have been proposed using such protocols.

For example, the specification of Japanese Patent Laid-Open No. 2003-324449 discloses a technique whereby a wireless communication terminal constituting a network that receives accommodated-terminal (system load) information from an access point device and generates a neighbor AP information table. According to this technique, at the time of communication, the wireless communication terminal refers to the neighbor AP information table and selects the optimum access point device; therefore, this technique is capable of distributing the processing load of the access point device and distributing the traffic in the wireless network.

Furthermore, the specification of Japanese Patent Laid-Open No. 2005-094157 discloses a technique whereby a plurality of wireless communication terminals constituting a network that acquire identification information about other wireless communication terminals and transmits this identification information about the other wireless communication terminals to a wireless communication terminal accommodating apparatus. According to this technique, the wireless communication terminal accommodating apparatus senses the presence of a plurality of wireless communication terminals based upon the identification information of the wireless communication terminals, generates information indicating this relationship and ascertains the network topology of the overall wireless communication system.

Furthermore, the specification of Japanese Patent Laid-Open No. 2005-311576 discloses a technique whereby network topology management for a path search is implemented using identifiers of wireless communication terminals, the search being conducted among a plurality of wireless communication terminals that constitute an adhoc network. According to this technique, identifiers of a plurality of wireless communication terminals that are the target of a search in a network are included in a single path request message, and it is possible to perform path management for every wireless communication terminal by performing a broadcast within the network.

However, with each of these techniques set forth above, device configuration and capability in a network cannot be detected accurately if the above-mentioned protocols are not supported by even a single device included in the network. As a result, band control and path selection control that take into consideration wireless resources necessary for video transmission in a system cannot be carried out accurately.

Further, a wireless area subject to management cannot be identified in a case where even one wireless communication terminal (STA) is not associated with a wireless access point apparatus (AP) that does not support LLTD. In other words, if various information relating to a wireless area is inadequate, a problem which arises is that band control and path selection control that take into consideration wireless resources necessary for video transmission in a system cannot be carried out.

SUMMARY OF THE INVENTION

According to one aspect of the present invention, an information processing apparatus for managing a wireless terminal and a wireless base station included in a wireless network, the apparatus comprises: an acquisition unit configured to acquire information, which relates to the wireless base station detected by the wireless terminal, from the wireless terminal; a storage unit configured to correlate and store the wireless base station detected by the wireless terminal and a wireless terminal wirelessly connected to this wireless base station, based upon the information acquired by the acquisition unit; a deriving unit configured to derive a wireless base station which does not have a wireless connection with a wireless terminal, based upon the information stored by the storage unit; a requesting unit configured to request a wireless terminal, which has detected the wireless base station derived by the deriving unit, for transmission of data that has passed through this wireless base station; and a determination unit which, if data requested by the requesting unit that has passed through the wireless base station from the wireless terminal has not been received, is configured to determine that this wireless base station is a wireless base station that is not under management.

According to another aspect of the present invention, a method of controlling an information processing apparatus for managing a wireless terminal and a wireless base station included in a wireless network, the method comprises: an acquisition step of acquiring information, which relates to the wireless base station detected by the wireless terminal, from the wireless terminal; a storage step of correlating and storing the wireless base station detected by the wireless terminal and a wireless terminal wirelessly connected to this wireless base station, based upon the information acquired at the acquisition step; a deriving step of deriving a wireless base station which does not have a wireless connection with a wireless terminal, based upon the information stored at the storage step; a requesting step of requesting a wireless terminal, which has detected the wireless base station derived at the deriving step, for transmission of data that has passed through this wireless base station; and if data requested at the requesting step that has passed through the wireless base station from the wireless terminal has not been received, a determination step of determining that this wireless base station is a wireless base station that is not under management.

In accordance with the present invention, a technique is provided whereby a wireless device not under management in a wireless communication network can be rendered identifiable without this ability being influenced by whether or not a specific protocol is utilizable.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a diagram useful in describing a wireless communication system according to a first embodiment of the present invention;

FIG. 2 is a block diagram illustrating the internal structures of a wireless terminal and management apparatus according to the first embodiment;

FIGS. 3A and 3B are sequence diagrams for describing the operation of a network management apparatus 111 and wireless communication terminals 116 to 118 in the communication system according to the first embodiment;

FIG. 7 is a diagram illustrating examples of wireless related information management tables generated by wireless communication terminals 116 to 118;

FIG. 8 is a diagram illustrating an example of a wireless related information management table generated by a management terminal 111;

DESCRIPTION OF THE EMBODIMENTS

Figure 3B:
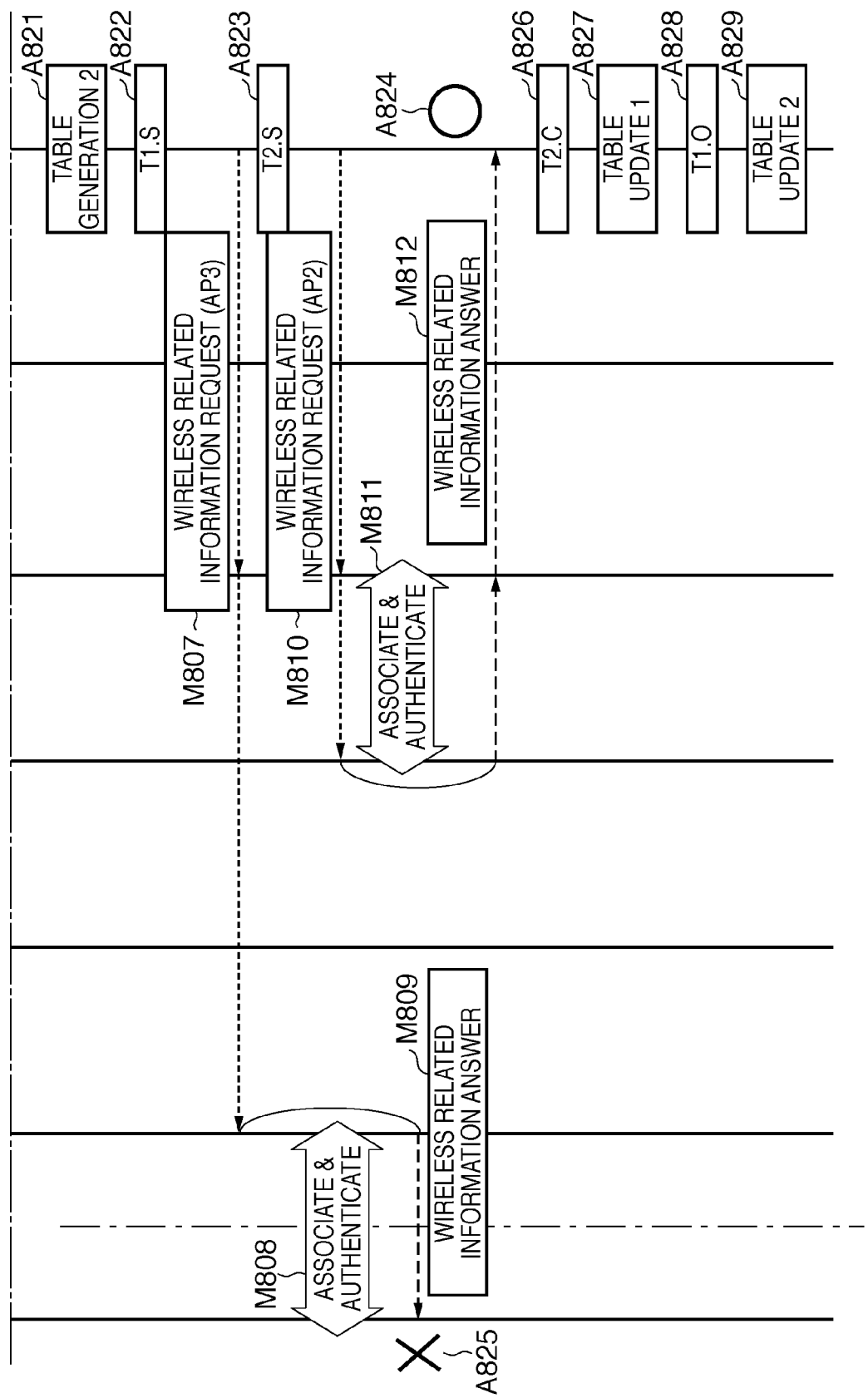

Preferred embodiments of the present invention will now be described in detail with reference to the drawings. The embodiments that follow are merely examples and do not limit the scope of the present invention.

First Embodiment

A management apparatus in a wireless network will now be described as a first embodiment of an information processing apparatus according to the present invention.

<System Configuration>

FIG. 1 is a diagram useful in describing a wireless communication system according to the first embodiment.

As shown in FIG. 1, a small-scale network 100 is used in the home and is connected to an Internet service provider (ISP) 101. There is also a small-scale network 103 different from the network 100. A network management apparatus 111 manages the network 100.

Access point devices (wireless base stations) 112 and 113 are connected to the network 100, and an access point device 114 is connected to the network 103. That is, the access point devices 112 and 113 are under the management of the management apparatus 111 but the access point device 114 is not. In the description rendered below, "AP1" is used as the SSID (network identification information) of the access point device 112, "AP2" is used as the SSID of the access point device 113, and "AP3" is used as the SSID of the access point device 114.

A display 115 with a built-in communication function is connected to the network 100 by wire. Wireless communication terminals (STA) 116 to 118 are connectable wirelessly via an access point device. For example, here it is assumed that the wireless terminals are a wireless surveillance camera 116, a wireless HDR (hard-disk recorder) 117 and a wireless DVC (digital video camera) 118.

FIG. 2 is a block diagram illustrating the internal structures of a wireless terminal and management apparatus according to the first embodiment.

A wireless terminal (STA) is shown on the left side of FIG. 2 and the management apparatus on the right side.

The wireless terminal (STA) includes a QoS middleware module 401, which is a processing module for controlling communication quality (QoS) in accordance with a command from the management apparatus 111. Included in the QoS middleware module 401 are a topology information acquisition unit 402; a database 403; a controller 404; a display unit 405 comprising an LCD or LEDs for notifying the user of error information and operating status; and an input unit 406 for accepting data input from a peripheral such as a keyboard or remote controller. The wireless terminal further includes a UPnP processing unit 407; a TCP/UDP/IP processing unit 408; and a network controller 409 of a wireless or wired LAN. Information acquisition processing 410 is executed with respect to the network controller 409.

The management apparatus, on the other hand, includes a QoS middleware module 411, which is a processing module for acquiring information from the wireless terminals and for controlling communication quality (QoS). Included in the QoS middleware module 411 are a topology information management unit 412; a database 413; a controller 414; a display unit 415 comprising an LCD or LEDs for notifying the user of error information and operating status; and an input unit 416 for accepting data input from a peripheral such as a keyboard or remote controller. The management apparatus further includes a UPnP processing unit 417; a TCP/UDP/IP processing unit 418; and a network controller 419 of a wireless or wired LAN.

A message 420 is transmitted from the management apparatus to the client, and a message 421 is transmitted from the client to the management apparatus.

<Apparatus Operation>

FIGS. 3A and 3B are sequence diagrams for describing the operation of the management apparatus 111 and wireless terminals 116 to 118 in the communication system according to the first embodiment.

Figure 4:
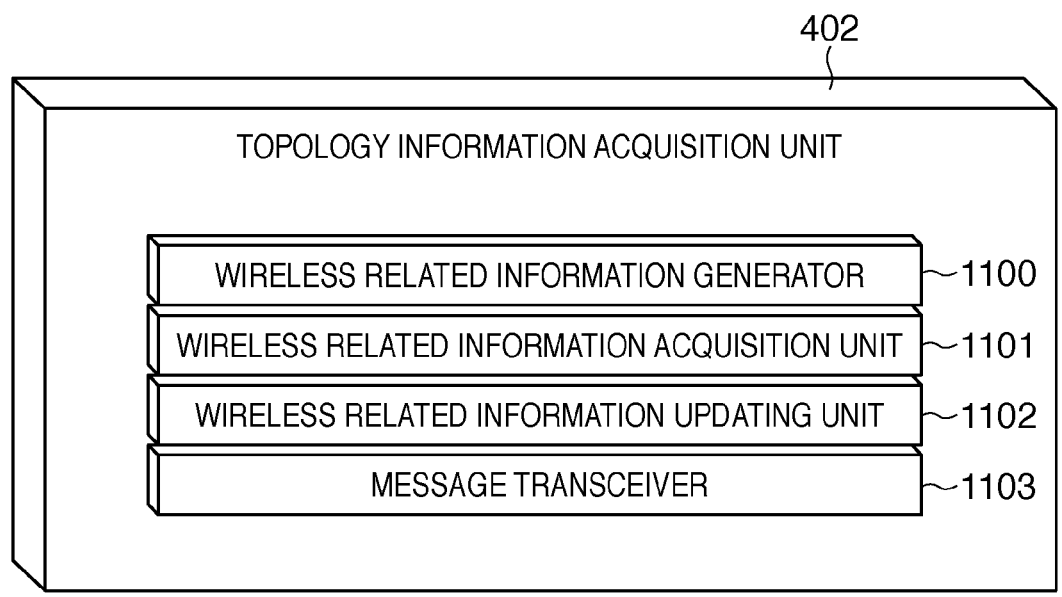
FIG. 4 is a detailed block diagram illustrating a topology information acquisition unit 402 installed in a QoS middleware module 401.
Figure 5:
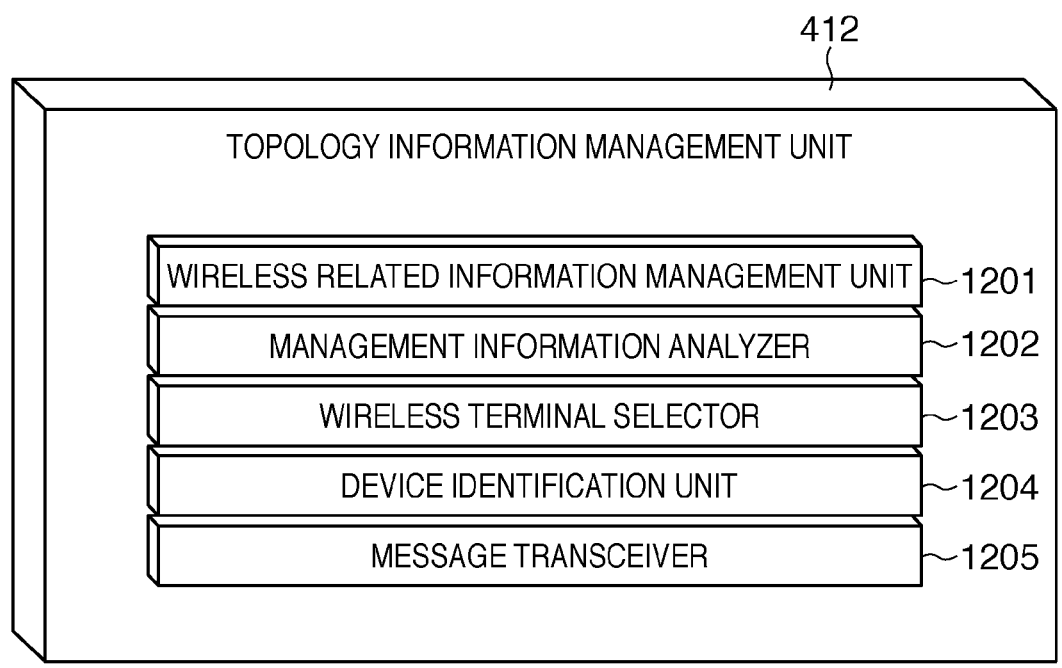
FIG. 5 is a detailed block diagram illustrating a topology information management unit 412 installed in a QoS middleware module 411.

FIG. 4 is a detailed block diagram illustrating the topology information acquisition unit 402 installed in the QoS middleware module 401. The topology information acquisition unit 402 includes a wireless related information generator 1100, a wireless related information acquisition unit 1101, a wireless related information updating unit 1102 and a message transceiver 1103. FIG. 5 is a detailed block diagram illustrating the topology information management unit 412 installed in the QoS middleware module 411. The topology information management unit 412 includes a wireless related information management unit 1201, a management information analyzer 1202, a wireless terminal selector 1203, a device identification unit 1204 and a message transceiver 1205. The operation and function of each of these components will be described with reference to the sequence chart set forth below.

In FIG. 1, the wireless terminals 116 to 118 are capable of verifying the presence of the access points 112, 113, 114, which are areas that can be reached by radio waves, by executing processing for scanning (searching for) access point devices. In the scan processing for access point devices, information that differs in dependence upon placement of terminals and installation environment is gathered by the wireless related information acquisition unit 1101 of topology information acquisition unit 402 installed in each of the wireless terminals 116 to 118. The items of wireless related information, which are specific to the wireless terminals and are the result of the scan processing, are stored as a wireless related information acquisition table in the database 403 installed in each of the wireless terminals 116 to 118.

Processing for generating initial wireless related information acquisition table FIG. 7 is a diagram illustrating examples of wireless related information management tables generated by the wireless terminals 116 to 118. Indicated at T201, T202 and T203 are a wireless related information acquisition table of the wireless surveillance camera 116 generated based upon the result of scan processing at A818 in FIG. 3A, a wireless related information acquisition table of the wireless HDR 117 generated based upon the result of scan processing at A819, and a wireless related information acquisition table of the wireless DVC 118 generated based upon the result of scan processing at A820, respectively.

The wireless related information that constitutes the tables generated by execution of the scan processing in the wireless terminals 116 to 118 is managed for every access point device in the vicinity and is gathered by execution of information acquisition processing 410.

The wireless related information acquisition tables T201 to T203 exemplified in FIG. 7 consist of the information elements described below. Specifically, the wireless related information acquisition tables T201 to T203 store, in correlated form, access point devices and wireless terminals that have been wirelessly connected to these access point devices.
Area No.: wireless area identification number (index)
SSID: network identification information used by the access point device
BSSID: MAC address of the access point device
RSSI: receive signal strength (dB) of radio waves at the wireless terminal from the access point device
Assoc: information indicating the access point that is associate (the target of wireless connection) (example: an AP that is an associate is indicated by "1" and APs that are not associates are indicated by "0")
PHYRate: maximum physical transmission rate (link speed) at which communication is possible
DataRate: transmission rate of communication currently in progress ("0" when the AP is not being used)

The wireless related information acquisition tables are stored and managed in the databases 403 by the wireless related information acquisition units 1101 installed in the topology information acquisition units 402 of the wireless terminals 116 to 118.

Figure 6:
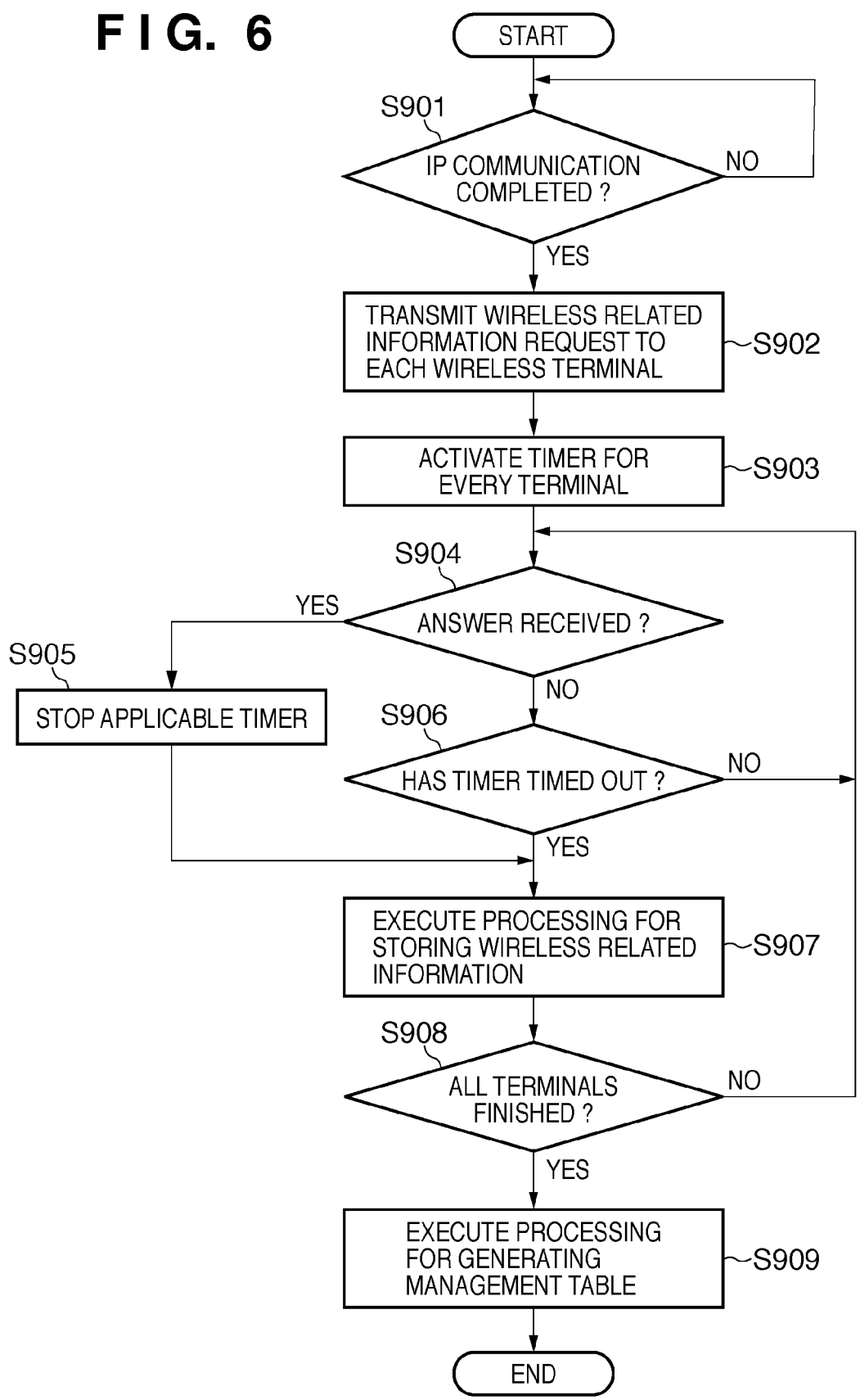
FIG. 6 is a flowchart useful in describing processing for generating a wireless related information management table.

FIG. 6 is a flowchart useful in describing processing for generating a wireless related information management table.

The management apparatus 111 and wireless terminals 116 to 118 communicate with each other utilizing the UPnP protocol after establishment of IP communication, which is a communication processing function. The wireless terminals 116 to 118 are all associated with the access point device 112, and communication between the wireless terminals 116 to 118 and the management apparatus 111 is carried out via the access point device 112.

When the management apparatus 111 establishes IP communication with each of the wireless terminals 116 to 118 ("YES" at S901), the controller 414 requests the topology information management unit 412 to execute message transmit processing, described below.

Using the message transceiver 1205, the topology information management unit 412 transmits a wireless related information request message 301 (M801 to M803 in FIG. 3A) to the wireless terminals 116 to 118 (S902). As shown in FIG. 3A, messages M801, M802 and M803 are transmitted to the wireless surveillance camera 116, wireless HDR 117 and wireless DVC 118, respectively.

At this time the controller 414 of the management apparatus 111 activates an answer-message receive timer for every wireless terminal (S903) and transitions to a standby state in which it awaits reception of answer messages from the wireless terminals 116 to 118 (S904).

Figure 9:
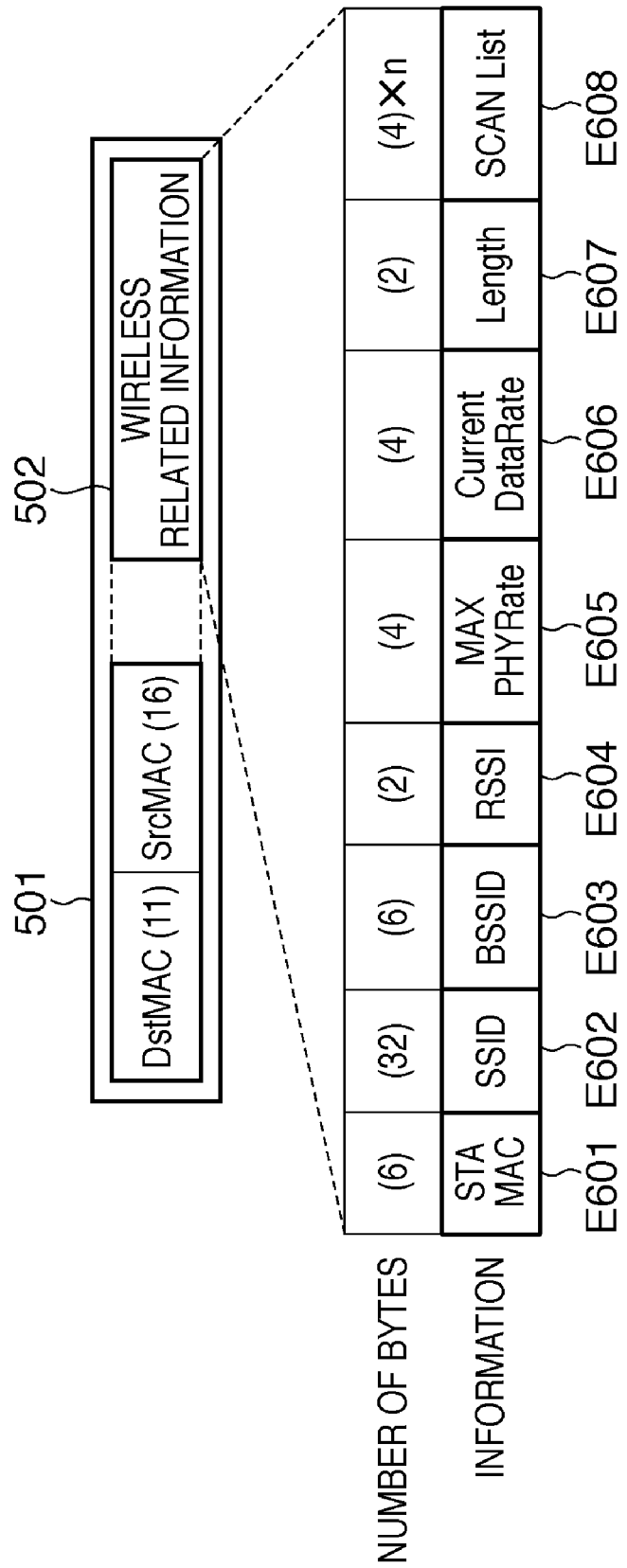
FIG. 9 is a diagram exemplifying the format of an answer message.

FIG. 9 is a diagram exemplifying the format of an answer message.

Specifically, shown in FIG. 9 are an example of frame format 501 of the answer message to the management apparatus 111 from each of the wireless terminals 116 to 118, and wireless related information 502 contained in a data frame of the answer message. The details of the information elements in the data frame will be described later. Messages (M804 to M806) shown in FIG. 3A are answer messages transmitted from the wireless terminals 116 to 118 to the management apparatus 111.

In FIG. 9, the wireless related information 502 includes a MAC address (STA MAC) E601 of the wireless terminal; network identification information (SSID) E602 of the currently associated access point device; a MAC address (BSSID) E603 of the currently associated access point device; receive signal strength (RSSI) E604 from the currently associated access point device; maximum bit rate (MAX PHYrate) E605 at which communication is possible with the currently associated access point device; bit rate (Current DataRate) E606 at which communication is being performed; data length (Length) of a list relating to a plurality of access point devices detected when the surrounding state of communication is scanned by the wireless terminals 116 to 118; and detailed data E608 regarding the scan list, as described below.

The scan list E608 is composed of information elements of detected access point devices other than the currently associated access point devices, and the details thereof are as follows:
SSID: network identification information used by the access point device;
BSSID: MAC address of the access point device; and
RSSI: receive signal strength (dB) of radio waves at the wireless terminal from the access point device.

Upon detecting the message 301, the controller 404 of each of the wireless terminals 116 to 118 requests the topology information acquisition unit 402 to send back an answer message 503 that includes the wireless related information 502. Upon receiving this request, the topology information acquisition unit 402 of each of the wireless terminals 116 to 118 executes the processing described below using the wireless related information generator 1100.

The wireless related information generator 1100 generates the answer message 501, which contains the wireless related information 502, by referring to the wireless-related information elements in the wireless related information acquisition tables T201 to T203. Further, the wireless related information generator 1100 of each of the wireless terminals 116 to 118 transmits the answer message 501 to the management apparatus 111 using the message transceiver 1103.

Thus, the management apparatus 111 receives the message M804 from the wireless surveillance camera 116, the message M805 from the wireless HDR 117 and the message M806 from the wireless DVC 118 ("YES" at S904). It should be noted that all of the answer messages M804 to M806 reach the management apparatus 111 by being relayed by the access point device 112.

Upon receiving the answer messages, the controller 414 of the management apparatus 111 halts the receive timers corresponding to the respective wireless terminals (S905).

Thereafter, the wireless related information 502 of the wireless terminals 116 to 118 is stored in the database 413 by the wireless related information management unit 1201 in the topology information management unit 412 of the management apparatus 111 (S907).

If an answer-message receive timer times out ("YES" at S906), the wireless related information 502 relating to this wireless terminal is recorded as indeterminate (S907) and answer processing from the other wireless terminals is continued ("NO" at S908).

When the management apparatus 111 receives answer messages from all of the wireless terminals in the system ("YES" at S908), the wireless related information management unit 1201 reads out the wireless related information 502. The wireless related information management unit 1201 then constructs a wireless related information management table using the wireless related information 502 and stores the table in the database 413 (S909) (A821).

FIG. 8 is a diagram illustrating an example of a wireless related information management table T504 generated by the management apparatus 111. The table T504 is stored in the database 413 (storage unit) and is composed of the following information elements, by way of example:

SSID: network identification information used by the access point device;
BSSID: MAC address of the access point device;
STA ID: identification ID of the wireless terminal;
STA MAC: MAC address of the wireless terminal
RSSI: receive signal strength (dB) of radio waves at the wireless terminal from the access point device;
PHYRate: maximum physical transmission rate (link speed) at which communication is possible; and
DataRate: transmission rate of communication currently in progress ("0" when the AP in not being used).

The value of each item included in the wireless related information management table T504 (a list of wireless base stations) is derived from the wireless related information 502 contained in the answer message 501 from each wireless terminal. The wireless related information management table is stored in the database 413 and managed by the wireless related information management unit 1201 installed in the topology information management unit 412 of the management apparatus 111. In other words, the access point devices are stored in correlation with the wireless terminals associated with these access point devices.

Processing for Updating Wireless Related Information Management Table

A list of access point devices that are candidates for management are obtained from the wireless related information management table T504 generated as described above. However, the wireless related information management table T504 also contains an access point device (here AP 114) that is not under the management of the management apparatus 111. It should be noted that it is possible to determine that the access point device that has relayed the answer messages from the wireless terminals 116 to 118 to the management apparatus 111, i.e., the access point device with which the wireless terminals 116 to 118 are associated, is under the management of the management apparatus 111. With this method alone, however, there is an access point device (here AP 113) which, despite the fact that it is under the management of the management apparatus 111, is erroneously determined not to be under the management of the management apparatus 111.

Accordingly, in the first embodiment, as will be described below, an access point device that is not under management is determined by issuing a request for an answer message that has passed through each access point device contained in the wireless related information management table T504.

Figure 10:
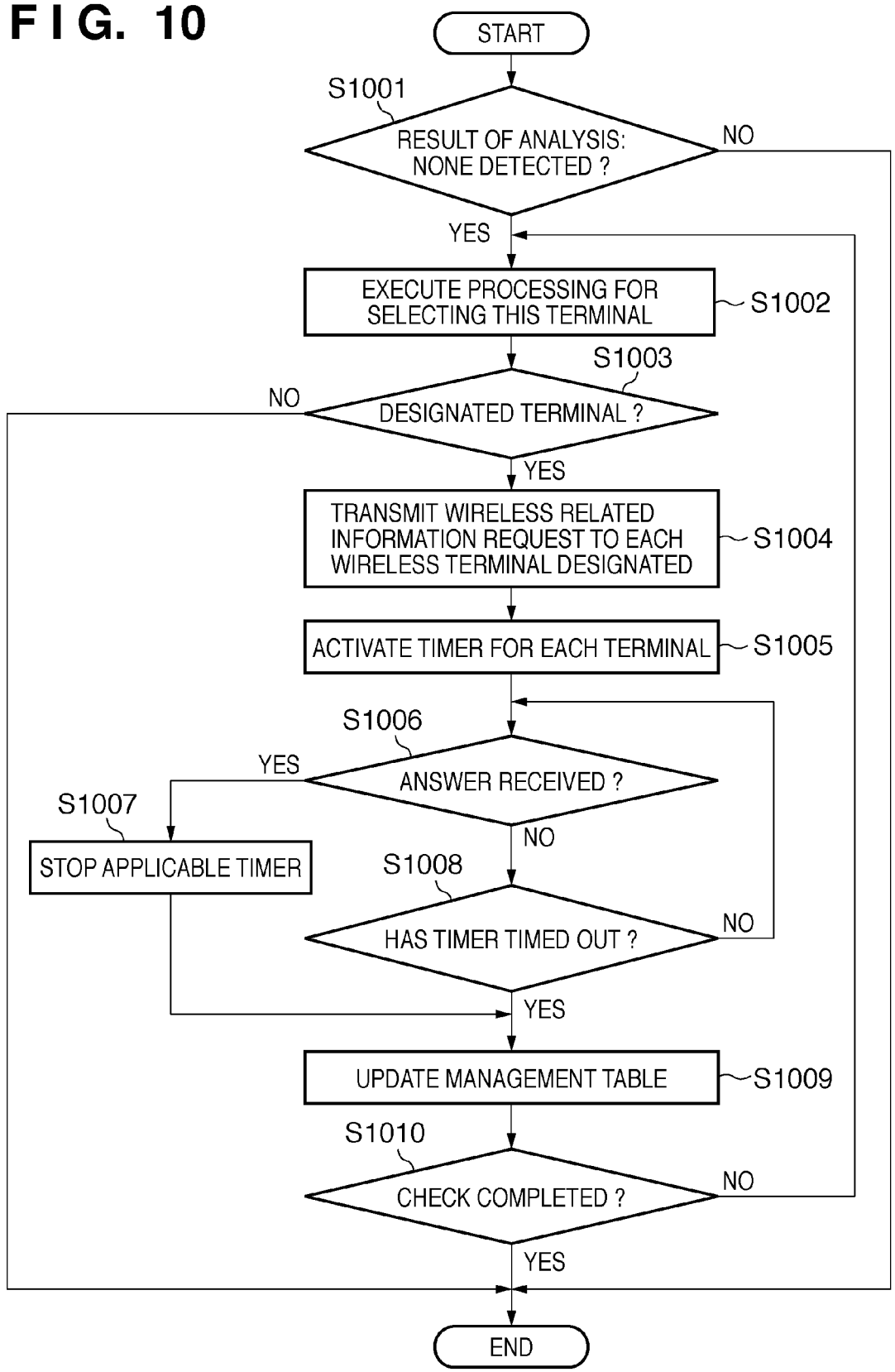
FIG. 10 is a flowchart useful in describing processing for updating a wireless related information management table.

FIG. 10 is a flowchart useful in describing processing for updating the wireless related information management table. This processing is executed by the management apparatus 111 based upon the information in the wireless related information management table T504 already generated.

The management information analyzer 1202 installed in the topology information management unit 412 investigates the wireless related information management table T504 and searches for any access point having no history of being associated with even a single wireless terminal. In other words, the management information analyzer 1202 searches for an access point device with which an associated wireless terminal has not been correlated. Then, if the result of the analysis by the management information analyzer 1202 of topology information management unit 412 is that an unassociated access point device does not exist ("NO" at S1001), processing is exited.

If an applicable access point device does exist ("YES" at S1001), the wireless terminal selector 1203 of the topology information management unit 412 selects a wireless terminal that is caused to be associated with this access point device based upon the wireless related information management table T504 (S1002). Ideally, the arrangement adopted is such that a wireless terminal having a higher RSSI value is selected with respect to the access point devices detected in the system and registered in the wireless related information management table T504.

In accordance with the information in the wireless related information management table T504, the wireless DVC 118, which has a higher RSSI value, is selected as the wireless terminal associated with the access point device 113. Similarly, the wireless surveillance camera 116, which has a higher RSSI value, is selected as the wireless terminal associated with the access point device 114.

In a case where a selectable wireless terminal cannot be selected for some reason, e.g., because it is in use, then the wireless terminal having the next higher RSSI value is selected from among the wireless terminals capable of being associated with the applicable access point device (S1002).

On the other hand, in a case where not even a single selectable wireless terminal exists in the system ("NO" at S1003), processing is exited. The management apparatus 111 thenceforth requests the operations (1) and (2) below of the applicable wireless terminal. In other words, the management apparatus 111 specifies data transmission via an access point device having no history of association.

(1) Associate with an access point device
(2) Transmit a wireless related information answer message via the newly associated access point device If a wireless terminal judged to be capable of performing the prescribed operations (1) and (2) is selectable ("YES" at S1003), then the wireless terminal selector 1203 transmits a wireless related information request message to this wireless terminal using the message transceiver 1205 (S1004). At this time a wireless related information request message (M807) is transmitted via the access point device 112 to the wireless surveillance camera 116 selected as the wireless terminal to be associated with the access point device 114. Similarly, a wireless related information request message (M810) is transmitted via the access point device 112 to the wireless DVC 118 selected as the wireless terminal to be associated with the access point device 114. It should be noted that the wireless related information request message includes a request to change over the access point device that is the target of association, as well as information (SSID, BSSID) concerning this access point device.

Further, the controller 414 of the management apparatus 111 activates the answer-message receive timer [wireless surveillance camera 116: T1.S (A822)/wireless DVC 118: T2.S (A823)] for every wireless terminal (S1005). The controller 414 of the management apparatus 111 then transitions to the standby state in which it waits for answer messages from the wireless terminals 116 and 118 (S1006).

Figures 11, 12:
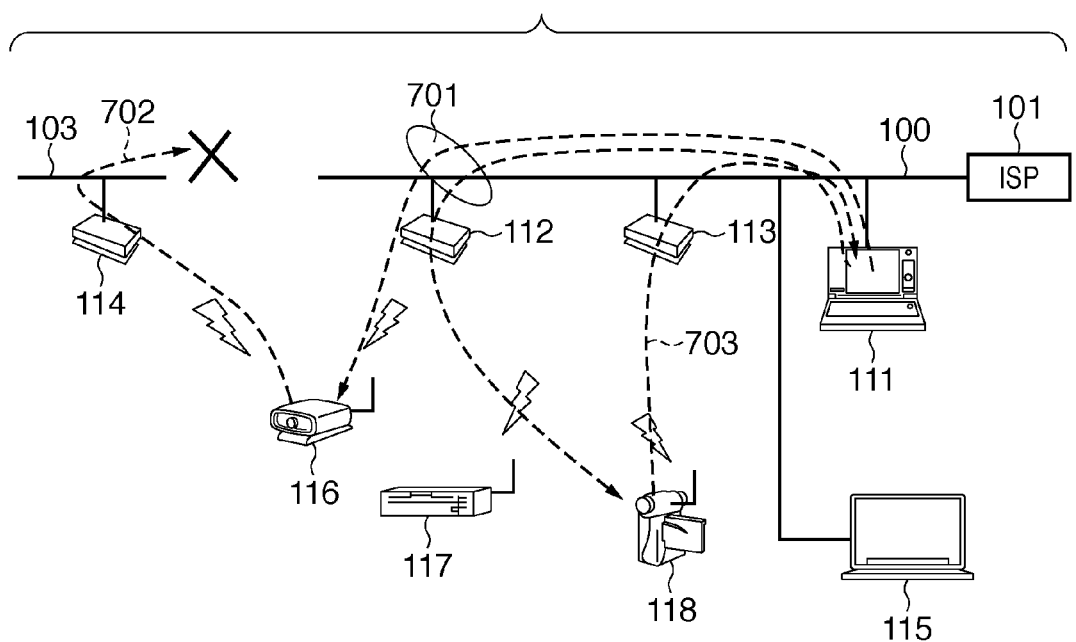
FIG. 11 is a diagram useful in describing transmission of a wireless related information answer message in a wireless communication system.
FIG. 12 is a diagram illustrating an example of a wireless related information management table after updating.

FIG. 11 is a diagram useful in describing transmission of the wireless related information answer message in the wireless communication system.

A group of messages 701 are messages (M808, M810) transmitted by the management apparatus 111 selecting the wireless terminals 116 and 118 from among the wireless terminals 116 to 118. A message 702 is in response to message 701. This is a message (M809) transmitted by the wireless surveillance camera 116 after it is associated (M808) with the access point device 114. A message 703 is in response to message 701. This is a message (M812) transmitted by the wireless DVC 118 after it is associated (M811) with the access point device 113.

Processing Relating to Wireless Monitoring Camera 116

The controller 404 of the wireless surveillance camera 116 that has received the wireless related information request message (M807) executes processing (M808) to associate itself with the access point device 114. If the association processing (M808) is incomplete or has failed, the controller 404 of the wireless surveillance camera 116 terminates processing for sending back the answer message to the management apparatus 111. If the association processing (M808) is completed, then the controller 404 sends the wireless related information answer message (M809) back to the management apparatus 111 via the access point device 114.

Since the wireless related information answer message (M809), which is answer message 702, is similar to the wireless related information answer message (M804) of answer message 503, the internal processing of the wireless surveillance camera 116 need not be described.

Since the access point device 114 is connected to the network 103, which is different from the network 100 being managed by the management apparatus 111, the answer message 702 does not arrive at the management apparatus 111 (A825). Accordingly, the management apparatus 111 is incapable of receiving the wireless related information answer message M809 from the wireless surveillance camera 116 ("NO" at S1006) and the answer-message receive timer times out (T1.O) (A828) ("YES" at S1008).

The wireless related information management unit 1201 updates (deletes in this case) the information relating to the access point device 114 in the wireless related information management table T504 stored in database 413 (S1009) (A829).

Processing Relating to Wireless DVC 118

Similarly, the controller 404 of the wireless DVC 118 that has received the wireless related information request message (M810) executes processing (M811) for associating itself with the access point device 113. If the association processing (M811) is incomplete or has failed, the controller 404 of the wireless DVC 118 terminates processing for sending back the answer message to the management apparatus 111. If the association processing (M811) is completed, then the controller 404 sends the wireless related information answer message (M812), which is the answer message 703, back to the management apparatus 111 via the access point device 113.

Since the wireless related information answer message (M812), which is answer message 703, is similar to the wireless related information answer message (M806) of answer message 503, the internal processing of the wireless DVC 118 need not be described.

Since the access point device 113 is connected to the network 100, which is being managed by the management apparatus 111, the answer message 703 is capable of being received by the management apparatus 111 via the access point device 113 (A824). At this time the controller 414 of the management apparatus 111 that has received the wireless related information answer message (M812) stops the answer-message receive timer (T2.C) (A826) (S1007).

The wireless related information management unit 1201 updates the information relating to the access point device 113 in the wireless related information management table T504 stored in database 413 (S1009) (A827).

Thus, if the prescribed operations (1), (2) are completed with regard to all wireless communication terminals that are selectable in the system ("YES" at S1010), the device identification unit 1204 of the management apparatus 111 identifies the access point device not under management. That is, the access point device 114 that has not relayed the answer message to the management apparatus 111 is identified as the access point device that is not under management. Further, the access point device 113 that has relayed the answer message to the management apparatus 111 is identified as the access point device that is under management. Further, it may be so arranged that a topology determination of the network is performed. It may be arranged so that the communication band used by the access point device under management is controlled based upon the topology determined.

The management apparatus 111 executes the processing of S1002 to S1009 repeatedly until a prescribed command is completed with respect to all wireless communication terminals selectable in the system ("NO" at S1010). When the repetition of S1002 to S1009 is completed, the wireless related information management unit 1201 reconfigures (704 in FIG. 12) the wireless relating information of every access point device in the wireless related information management table T504.

FIG. 12 is a diagram illustrating an example of the wireless related information management table after updating. Here FIG. 12 illustrates a state in which the access point device whose SSID is "AP3", namely the access point device 114, has been deleted.

It is described above that when the controller 414 of the management apparatus 111 has detected establishment of IP communication, the controller requests the topology information management unit 412 to transmit the message 301. However, it may be arranged so that the wireless related information updating unit 1102 of the topology information management unit 412 transmits the message 301 to the communication terminals 115 to 118 periodically (at fixed intervals). By adopting such an arrangement, the processing (S1001 to S1010) for updating the wireless related information management table T504 in the management apparatus 111 is executed repeatedly.

In this case, it is possible to also determine the status (operating/quiescent) of an existing access point device using history information. This has the effect of improving the ability to control the communication band in the system.

Further, it is described above that a request to transmit an answer message that has passed through an access point device with which a wireless terminal is not associated is issued in order from this access point device from the wireless terminal having the high RSSI. However, it does not matter if the answer-message transmit request is not issued to all wireless terminals that are capable of detecting this access point device. The reason is that at the moment an answer message from a single wireless terminal could be received, it can be determined that the access point device that relayed this answer message is an access point device that is subject to management by the management apparatus.

As described above, a terminal under management (or one not under management) can be identified even in a network that includes wireless devices that do not support various discovery protocols such as UPnP, LLDP and LLTD. By identifying a target wireless area that provides a service based upon this management information and detecting the network configuration accurately, it is possible to manage the wireless resources usable by the system and the network topology. As a result, it is possible to implement band control and path selection control that take into consideration the wireless resources necessary for video transmission in a system.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-213223, filed Aug. 21, 2008, which is hereby incorporated by reference herein in its entirety.

What is claimed is:

1. An information processing apparatus for managing one or more wireless terminals and one or more wireless base stations included in a wireless network, the information processing apparatus comprising:
   at least one processor;
   an acquisition unit configured to acquire information from a wireless terminal, the information being related to a wireless base station, the wireless base station being detected by the wireless terminal;
   a storage unit configured to correlate and store the wireless base station detected by the wireless terminal and a wireless terminal wirelessly connected to the wireless base station, based upon the information acquired by the acquisition unit;
   a deriving unit configured to derive another wireless base station not having a wireless connection with a wireless terminal, based upon the information stored by the storage unit;
   a requesting unit configured to request a wireless terminal, the requested wireless terminal having detected the another wireless base station derived by the deriving unit, for transmission of data having passed through the another wireless base station; and
   a determination unit which, when data requested by the requesting unit having passed through the another wireless base station from the wireless terminal has not been received, is configured to determine the another wireless base station is not under management of the information processing apparatus;
   wherein the information stored by the storage unit includes a history of wireless terminals having been wirelessly connected to the wireless base station; and
   the deriving unit derives a wireless base station having no history of being wirelessly connected to a wireless terminal;
   wherein the acquisition unit, the deriving unit, the requesting unit and the determination unit are implemented, at least in part, by the at least one processor.

2. The apparatus according to claim 1, wherein when data requested by the requesting unit that has passed through the another wireless base station from the wireless terminal has been received, the determination unit determines that the another wireless base station is a base station under management.

3. The apparatus according to claim 1, wherein the request issued by the requesting unit includes a request to change over the wireless connection to the another wireless base station derived by the deriving unit.

4. The apparatus according to claim 1, wherein the information relating to the wireless base station acquired from the wireless terminal by the acquisition unit includes strength of a signal received at this wireless terminal from the wireless base station;
   the apparatus further comprising a selecting unit configured to select a wireless terminal that requests transmission of data by the requesting unit, based upon strength of a signal received at each wireless terminal from the wireless base station, from among a plurality of wireless terminals that have detected the wireless base station derived by the deriving unit.

5. The apparatus according to claim 1, further comprising an updating unit configured to update the information, which has been stored by the storage unit, in accordance with receipt of data requested by the requesting unit that has passed through the wireless base station from the wireless terminal.

6. The apparatus according to claim 1, wherein information relating to the another wireless base station determined by the determination unit not to be under management is deleted from the information stored by the storage unit.

7. The apparatus according to claim 1, wherein acquisition of information by the acquisition unit is performed at fixed intervals.

8. A method of controlling an information processing apparatus for managing one or more wireless terminals and one or more wireless base stations included in a wireless network, the method comprising:
   an acquisition step of acquiring information, the information being related to a wireless base station, the wireless base station being detected by the wireless terminal;
   a storage step of correlating and storing the wireless base station detected by the wireless terminal and a wireless terminal wirelessly connected to the wireless base station, based upon the information acquired at the acquisition step;

a deriving step of deriving another wireless base station not having a wireless connection with a wireless terminal, based upon the information stored at the storage step;

a requesting step of requesting a wireless terminal, the requested wireless terminal having detected the another wireless base station derived at the deriving step, for transmission of data having passed through the another wireless base station; and when data requested at the requesting step having passed through the another wireless base station from the wireless terminal has not been received, a determination step of determining that the another wireless base station is a wireless base station that is not under management of the information processing apparatus;

wherein the information stored by the storage step includes a history of wireless terminals that have been wirelessly connected to the wireless base station; and the deriving step derives a wireless base station having no history of being wirelessly connected to a wireless terminal.

9. A non-transitory computer-readable storage medium, including a program that, when executed by a computer, causes the computer to execute a method of controlling an information processing apparatus for managing one or more wireless terminals and one or more wireless base stations included in a wireless network, the method comprising:

an acquisition step of acquiring information, the information being related to a wireless base station, the wireless base station being detected by the wireless terminal;

a storage step of correlating and storing the wireless base station detected by the wireless terminal and a wireless terminal wirelessly connected to the wireless base station, based upon the information acquired at the acquisition step;

a deriving step of deriving another wireless base station not having a wireless connection with a wireless terminal, based upon the information stored at the storage step;

a requesting step of requesting a wireless terminal, the requested wireless terminal having detected the another wireless base station derived at the deriving step, for transmission of data having passed through the another wireless base station; and when data requested at the requesting step having passed through the another wireless base station from the wireless terminal has not been received, a determination step of determining that the another wireless base station is a wireless base station that is not under management of the information processing apparatus;

wherein the information stored by the storage step includes a history of wireless terminals that have been wirelessly connected to the wireless base station; and the deriving step derives a wireless base station having no history of being wirelessly connected to a wireless terminal.

* * * * *